United States Patent [19]
Glass et al.

[11] 3,798,885
[45] Mar. 26, 1974

[54] BALER PICKUP COUNTER-BALANCING MECHANISM AND PICKUP ROPE LIFT

[75] Inventors: Emmett F. Glass, Bird-in-Hand; Robert G. Young, Akron, both of Pa.

[73] Assignee: Sperry Rand Corporation, New Holland, Pa.

[22] Filed: Sept. 1, 1972

[21] Appl. No.: 285,951

[52] U.S. Cl. ............................................. 56/364
[51] Int. Cl. .......................................... A01d 89/00
[58] Field of Search ............. 56/15.8, 341, 344, 364

[56] References Cited
UNITED STATES PATENTS

| | | | |
|---|---|---|---|
| 3,229,454 | 1/1966 | Oshanyk | 56/364 |
| 2,795,100 | 6/1957 | Sund | 56/364 |
| 2,994,178 | 8/1961 | Hollyday | 56/344 |
| 3,408,802 | 11/1968 | Slates et al | 56/364 |
| 2,674,839 | 4/1954 | Russell | 56/341 |

*Primary Examiner*—Antonio F. Guida
*Assistant Examiner*—J. A. Oliff
*Attorney, Agent, or Firm*—Frank A. Seemar; John R. Flanagan; Joseph A. Brown

[57] ABSTRACT

A spring and cable assembly to counter-balance the pickup of a baler. A low rate spring of generally long length is mounted transversely to the baler above and parallel to the feeding chamber of the baler, the spring being interconnected with cable means which extend to at least one end of the pickup. Because of the low rate spring which may be employed when disposed in this position a manually operable rope lift may be employed to raise the pickup without requiring undue force.

10 Claims, 8 Drawing Figures

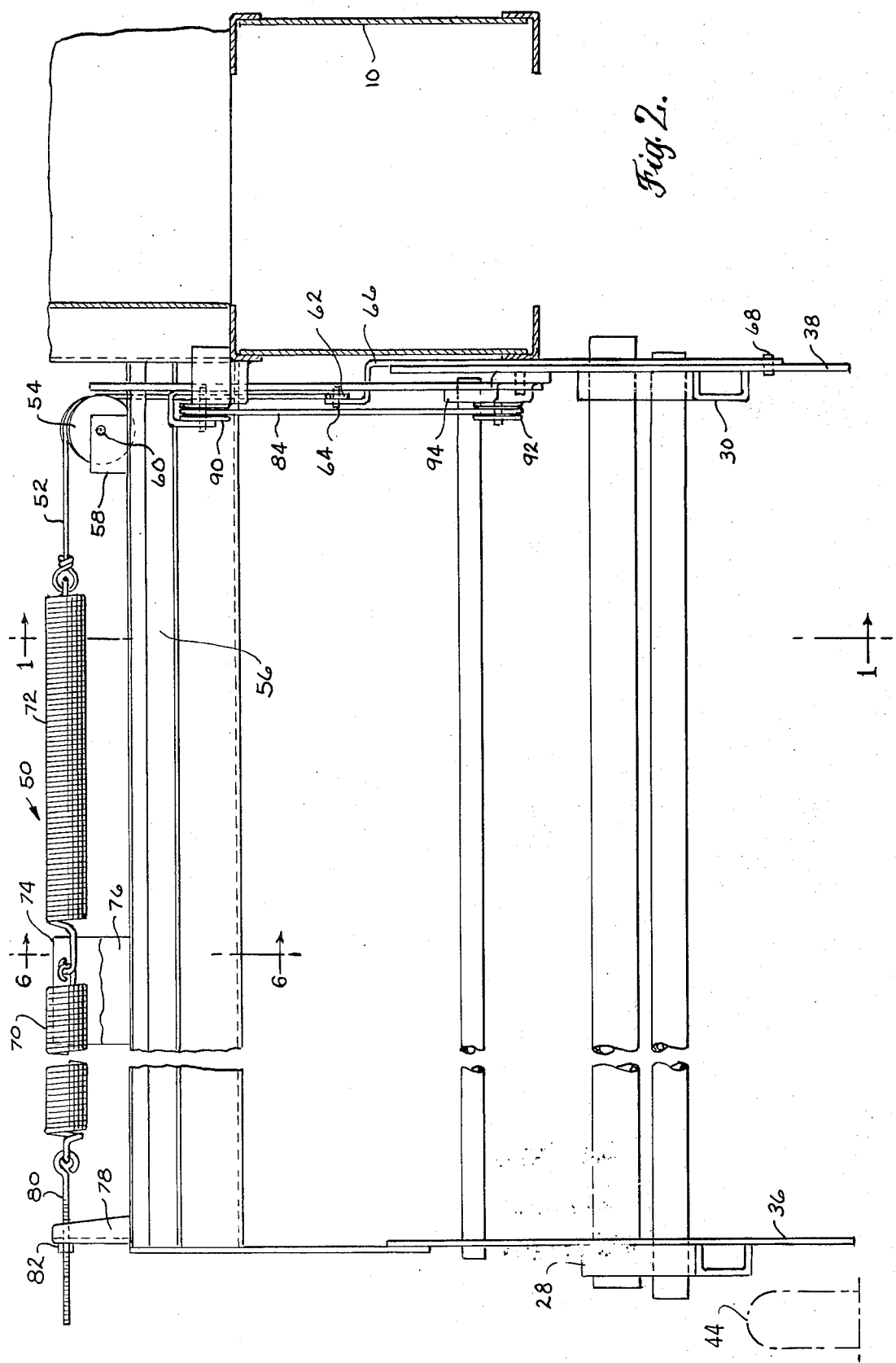

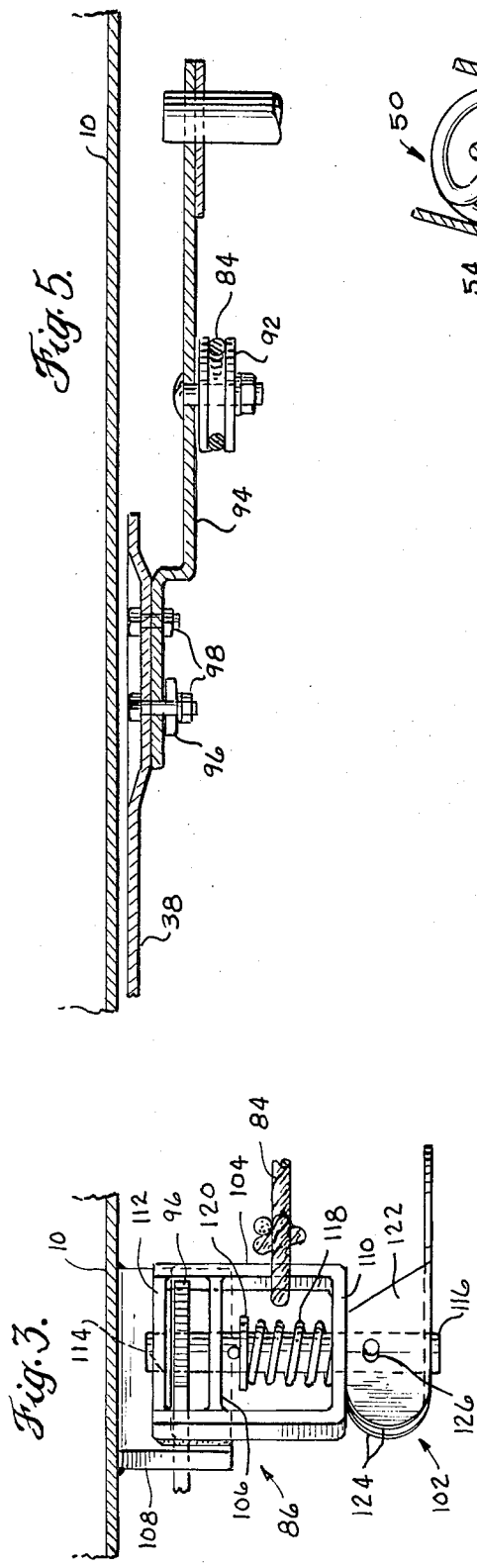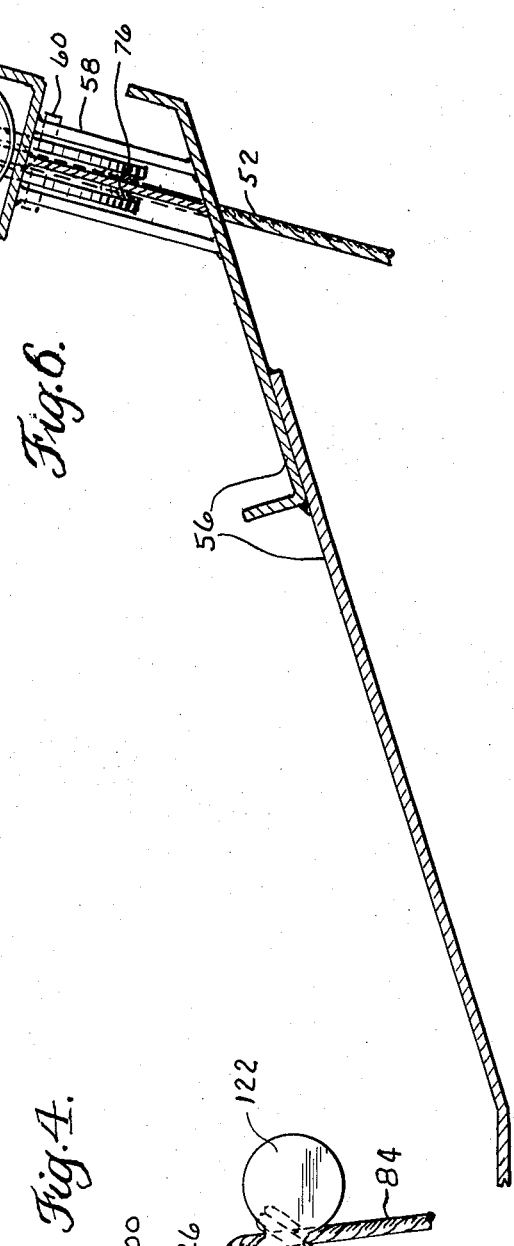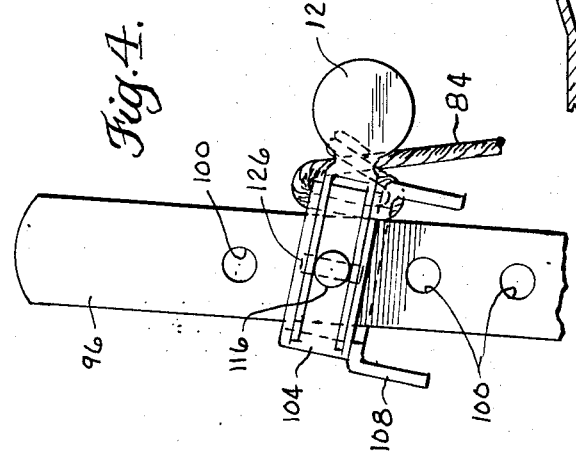

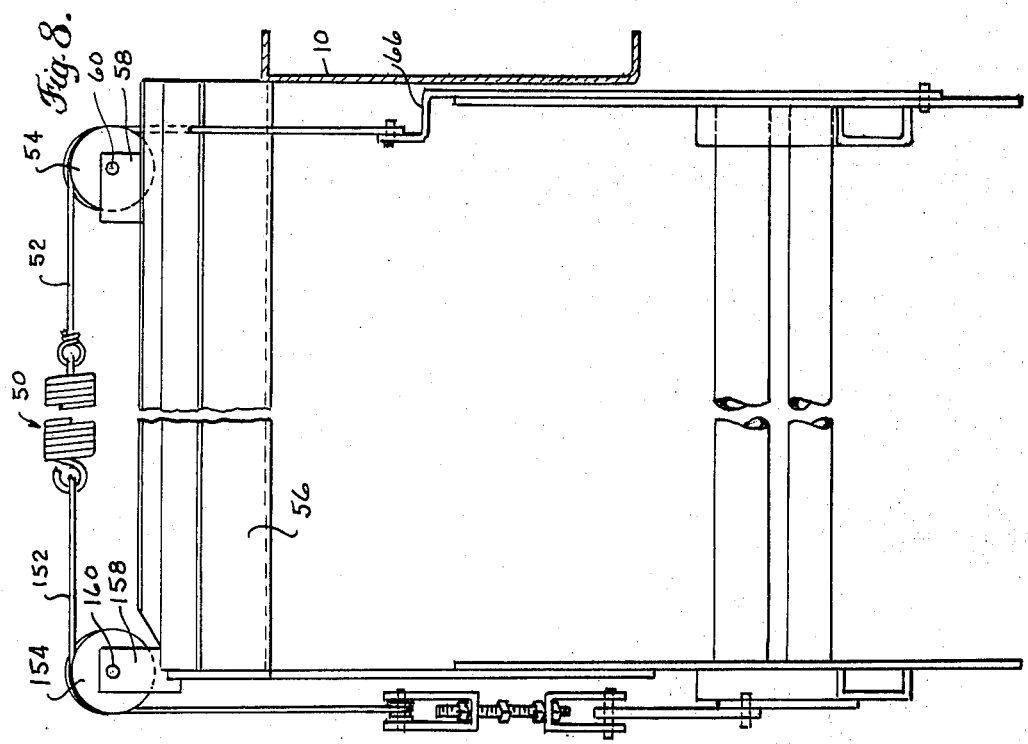
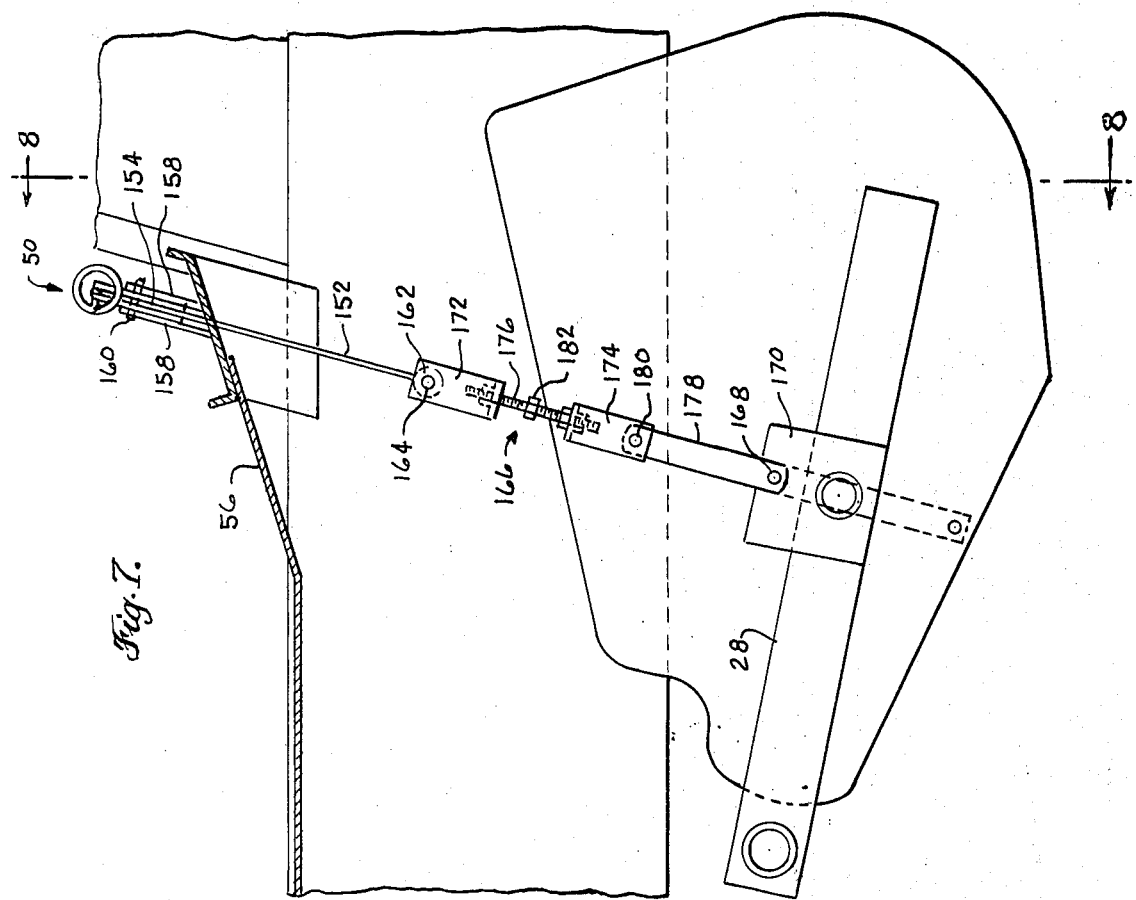

BALER PICKUP COUNTER-BALANCING MECHANISM AND PICKUP ROPE LIFT

FIELD OF THE INVENTION

The present invention relates to agricultural machinery and more particularly to balers having a counter-balanced pickup adapted to pick up windrowed crop material and to convey it rearwardly to the feeder of the baler, the pickup being pivotally mounted to swing between a lowered operative position and a raised inoperative or transport position.

BACKGROUND OF THE INVENTION

On prior art balers the spring which counter-balanced the pickup was traditionally disposed at right angles to the axis about which the pickup pivoted. Due to design considerations a short, high-rate spring has been employed. This spring tended to yield during operation and after several adjustments for proper pickup flotation all adjustment was used up. This resulted in heavy pickup flotation. Also, the force exerted by the spring rapidly decreased as the pickup was raised making it difficult to lift and lock the pickup into the raised position. Also, in prior art balers the spring was attached to a short moment arm creating a high bearing load and therefore friction had to be overcome by the spring.

OBJECTS OF THE INVENTION

It is the principle object of this invention to so dispose the counter-balancing mechanism for the pickup of a baler that a low rate spring can be employed and also to increase the moment arm as the spring force decreases.

It is a further object of the present invention to reduce the bearing load imposed on the pickup by the mechanism which counter-balances the pickup.

It is a further object of the invention to reduce the force required to raise the pickup whereby a manual pickup lift may be employed.

It is a further object of this invention to attach the counter-balancing mechanism generally at the center of gravity of the pickup assembly.

It is a further object of this invention in one species to eliminate the twisting effect on the pickup when the counter-balancing mechanism is attached to only one end of the pickup.

These and other objects and advantages of this invention will be apparent to those skilled in the art after a consideration of the following detailed description, taken in conjunction with the accompanying drawings in which the preferred form of this invention is illustrated.

DESCRIPTION OF THE DRAWINGS

FIG. 2 is a broken out cross section taken approximately on the line 2—2 of FIG. 1.

FIG. 3 is an enlarged detailed view of a latch device employed in the apparatus.

FIG. 4 is an elevational view of the latch device of FIG. 3.

FIG. 5 is an enlarged sectional view taken on the line 5—5 of FIG. 1 of a pulley bracket secured to a side sheet of the pickup.

FIG. 6 is an enlarged cross sectional view taken on the line 6—6 of FIG. 2.

FIG. 7 is a sectional elevation similar to FIG. 1 illustrating a second embodiment of the invention.

FIG. 8 is a broken out cross section taken on the line 8-8 of FIG. 7.

DETAILED DESCRIPTION OF THE EMBODIMENT SHOWN IN FIGS. 1 THROUGH 6

Figure 1:
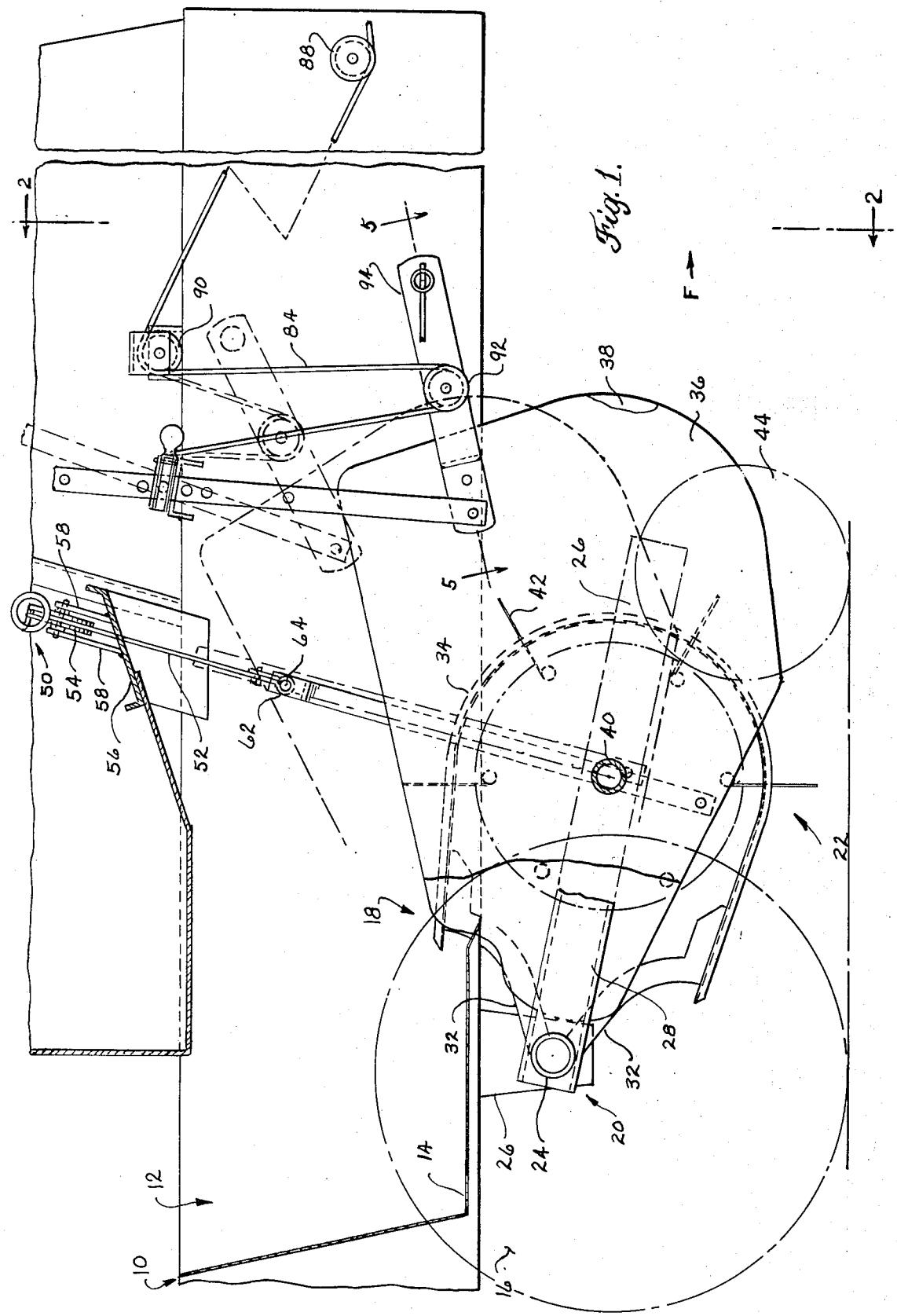
FIG. 1 is a sectional elevation of a first embodiment of a pickup lift system for balers constructed in accordance with the principles of this invention, the section being taken approximately on the line 1—1 of FIG. 2.

In the following description right-hand and left-hand reference is determined by standing to the rear of the baler and facing the direction of travel.

Referring first to FIG. 1, a portion of a baler is illustrated in this figure, the baler having a longitudinally extending bale case indicated generally at 10 and a transversely extending feeding chamber indicated generally at 12. Disposed over the floor 14 of the feeding chamber is a feeding mechanism (not illustrated) which is adapted to sweep material in the feeding chamber towards the bale case for compaction of the crop material into bales. The baler is supported by ground engaging wheels, one of which is illustrated by the broken lines at 16.

Disposed forwardly of the feeding chamber 12 is a pickup assembly indicated generally at 18. The pickup assembly includes pivot means, indicated generally at 20, and pickup means indicated generally at 22.

The pivot means 20 includes a transversely extending tubular member 24 which is rotatably journalled in bearings (not shown) carried by downwardly extending portions of the baler one of which is schematically illustrated 26. The pickup means includes right and left-hand channel members 28,30, respectively, which are secured at their rearward ends to the tubular member 24. A plurality of transversely disposed upwardly and downwardly extending pickup guard supports 32 are also secured at their rearward ends to the tubular member 24, the pickup guard supports being disposed between the channel members 28 and 30. Pickup guards 34 are secured to the forward portion of each of the upper and lower pickup guard supports. Right and left-hand pickup side sheet members 36,38, respectively, are secured to the left-hand side of the channel members 28,30, respectively. A transversely extending tubular member 40 is journalled in the forward ends of the channel members 28 and 30, the tubular member 40 supporting in a conventional manner a plurality of pickup fingers 42. The tubular member 40 and pickup fingers 42 are caused to be rotated in a counter clockwise direction (as viewed from FIG. 1) by a generally conventional mechanism (not illustrated). A ground engaging gauge wheel 44 is adjustably supported by the right-hand channel member in a generally conventional manner (not illustrated).

In FIG. 1 the pickup assembly is shown in full lines in its lowered operative position. In this position the height of the pickup assembly above the ground is gauged by the wheel 44. As the baler advances in a forward direction, illustrated by the arrow F, the pickup fingers 42 will engage crop material lying on the ground and convey it upwardly and rearwardly towards the feeding chamber 14. In order to prevent too much force from being imposed upon the gauge wheel 44 it has been customary in the past to counter-balance the pickup assembly by the means of springs or the like. However, in the past it has not been practical for the operator of the baler to manually lift the pickup assembly from the tractor seat to clear dead furrows, boarders, groundhog holes and the like as the spring force exerted on the pickup tended to decrease rapidly as the pickup was moved upwardly due to the high rate springs necessitated by prior designs.

According to the principals of this invention the means to counter-balance the pickup means comprises a relatively long low rate tension spring means, indicated generally at 50, the spring means being disposed parallel to and above the pickup means. As can best be seen from FIGS. 1 and 2 the spring means 50 is interconnected with the pickup means by a cable 52 which extends over a sheave 54 which is rotatably supported on a portion 56 of the baler by a pair of upstanding brackets 58 having a pivot pin 60 extending between them. The lower end of the cable 52 is provided with an eye 62 which is disposed about a pin 64 carried by the upper end of a link 66, the lower end of the link 66 being pivotally secured by means of pin 68 to the left-hand side sheet member 38.

While the spring means 50 could be one single long low rate spring it has been found more economical to employ two tension springs 70,72 whose adjacent ends are hooked together as can best be seen from FIG. 2. As can be seen from FIG. 2 and FIG. 6, the intermediate portion of the spring means 50 is supported by a saddle 74, the saddle in turn being supported by an upwardly extending bracket 76 whose lower end is supported on a portion of the baler 56. In the embodiment illustrated in FIGS. 1 through 6, the right-hand end of the spring means is adjustably secured to an upstanding bracket 78 which is secured on a portion of the baler 56. The mechanism for adjusting the tension of the spring means further includes a threaded eye bolt 80 which passes through an aperture in the bracket 78 and a nut 82 disposed about the eye bolt 80 and bearing against the outer surface of the bracket 78. To adjust the tension of the spring means it is only necessary to advance or retract the position of the nut 82 on the bolt 80.

In order to raise and lower the pickup assembly a manually operable rope or the like 84 is provided, the forward end of the rope or the like being engageable by the operator of the tractor which is employed to propel the baler forwardly over the ground. The rear end of the rope is tied to a latching bracket assembly indicated generally at 86 (FIG. 3). Intermediate portions of the rope are disposed over a plurality of sheaves, therebeing a forward sheave 88 rotatively journalled on a forward portion of the bale case, an intermediate sheave 90, also supported on the bale case, and a rear sheave 92 rotatively journalled on a forwardly extending bracket 94 whose rearward end is secured to the left pickup side sheet member 38. It should be obvious that as the rope is pulled in a forward direction 1 unit length that the sheave 92 will be raised ½ unit length thus giving the operator of the tractor a two to one mechanical advantage when raising the pickup.

A latching strap 96 extends upwardly from the left pickup side sheet 38 and is secured at its lower end by one of the fastening means 98 which is employed to secure the bracket 94 to the side sheet 38. The upper end of the latching strap 96 is provided with a plurality of apertures 100 that can be engaged by a spring biased latching pin assembly indicated generally at 102. The spring biased latching assembly 102 is supported by the latching bracket assembly 86, the bracket assembly including a box section 104 having an intermediate wall 106, the box section in turn being welded or otherwise rigidly secured to a bracket 108 supported on the right-hand side wall on the bale case 10. The right and left sides 110,112, respectively of the box section 104 as well as the intermediate wall 106 are provided with aligned apertures 114. The spring biased latching assembly 102 includes a pin member 116 disposed when in its inoperative position in the apertures 114 of the walls 110 and 106. The pin 116 is biased toward the aperture 114 in wall 112 by a spring 118 disposed about the pin and bearing against the left-hand side of wall 110 and a washer 120 carried by the pin. A manually operable lever 122 having a cam surface 124 is pivotally secured to the right-hand end of the latching pin 116 by a pivot pin 126. FIG. 3 shows the latching assembly in its operative or latching position and it should be noted that in this position the pin 116 extends not only through the apertures 114 in walls 110 and 106 but also through an aperture 100 in the latching strap 96 and the aperture 114 in wall 112. To move the latching assembly to its inoperative position it is only necessary to swing the lever 122 in a clockwise direction 90 degrees, the cam surface 124 tending to move the latching pin away from the bale case permitting upward and downward movement of the latch strap 96.

It should be noted that by employing the novel counter-balancing mechanism of this invention and the novel rope lift of this invention that it will be relatively easy to raise and lower the pickup assembly from the operator's station of the propelling tractor. However, when employing the latching mechanism illustrated in these figures it will be necessary to dismount from the operator's platform and to swing the lever to its operative position to secure the latching strap. However, it may be desirable to employ a self-resetting control mechanism and to this end it may be practical to employ a mechanism of the type illustrated in U.S. Pat. No. 2,826,933 or 2,892,351.

DESCRIPTION OF THE EMBODIMENT
ILLUSTRATED IN FIGS. 7 AND 8

The embodiment shown in FIGS. 7 and 8 differs from the embodiment shown in FIGS. 1 through 6 in that the means to counter-balance the pickup assembly is connected to both sides of the pickup. Thus, the right-hand end of the spring means 50 is connected to a cable 152 disposed over a sheave 154 which is interconnected with a portion of the baler 56 by brackets 158 and rotatably journalled about a pivot pin 160. The lower end of the cable 152 is provided with an eye 162 which is disposed about a pin 164 carried by an adjustable link assembly, indicated generally at 166. The lower hand end of the link assembly 116 is secured by a pivot pin 168 to a bracket 170 carried by a right-hand channel member 28. The adjustable link assembly 166 includes upper and lower U-shaped brackets 172,174 which are interconnected by a threaded turnbuckle 176 which passes through nuts supported by the U-shaped brackets 172,174. The adjustable link assembly 166 also includes a link 178 secured at its upper end to the lower U-shaped bracket by pivot pin 180 and at its lower end to the bracket 170 by pivot pin 168. By rotating the turnbuckle 176 by means of the nut 182 secured to its intermediate portion the distance between the U-shaped brackets 172,174 can be varied thereby adjusting the tension of the tension means 50.

The design shown in FIGS. 7 and 8 does not have the disadvantage of producing a twisting movement on the pickup as exists on the design shown in FIGS. 1 through 6. However, it should be noted that this twisting movement is not determined in practice since the pickup is quite rigid.

It should also be noted that the manual rope lift as shown in FIGS. 1 through 6 may be employed with the design shown in FIGS. 7 and 8. In the designs shown in FIGS. 1 through 6 and in FIGS. 7 and 8 the attaching point of the means which interconnects the tension means with the pickup means is such that as the pickup initially raises the moment arm will increase as the spring load decreases. This aids in providing a lesser reduction of spring assistance when the pickup raises for more uniform flotation and easier lifting of the pickup to transport position. Also, as can be seen from these figures, the direction of pull is such that the pickup pivot bearings are not absorbing excessive loads from the spring force thereby reducing friction at these points. Furthermore, the attaching point is located generally at the center of gravity for the pickup.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

Having thus described our invention, what we claim is:

1. In combination with a baler having
means operable to receive crop material and form said material into bales, and a pickup assembly including pivot means and pickup means disposed generally forwardly of said pivot means and operable to pick up and feed crop material to said receiving and forming means, said pickup means being swingably connected to said pivot means for vertical swinging movement between a lower operative position and a raised inoperative position, the combination therewith of means to counter-balance said pickup means comprising:
relatively low rate tension means disposed above and generally parallel to said pickup means; and means interconnecting said tension means with said pickup means and transforming a pulling force being imposed on one end of said interconnecting means by said tension means in a direction generally parallel to said pickup means into a pulling and lifting force being imposed on said pickup means by an opposite end of said interconnecting means in a direction upwardly from, and generally transverse to, said pickup means with said opposite end of said interconnecting means being connected to said pickup means at a location thereon being remotely spaced from said pivot means such that the moment arm of said upward, lifting force about said pivot means will be relatively long and increase as said pickup means is lifted toward its raised position and such that a high bearing load on said pivot means is avoided.

2. The combination set forth in claim 1 in which said location at which said opposite end of said interconnecting means is connected to said pickup means is at one side of said pickup means, proximate to the center of gravity of said pickup means and below the level of said pivot means of said pickup means is in its lower position.

3. The combination set forth in claim 1 wherein said tension means comprises two springs interconnected to each other.

4. The combination set forth in claim 1 further characterized by the provision of manually operable means to raise said pickup means, said manually operable means having an end portion coupled to said pickup means and extending upwardly therefrom which imposes an additional upward lifting force on said pickup means to raise said pickup means when said manually operable means is operated.

5. In combination with a baler having
means operable to receive crop material and form said material into bales, and a pickup assembly including pivot means and pickup means disposed generally forwardly of said pivot means and operable to pick up and feed crop material to said receiving and forming means, said pickup means being swingably connected to said pivot means for vertical swinging movement between a lower operative position and a raised inoperative position, the combination therewith of means to counter-balance said pickup means comprising:
relatively low rate tension means disposed above and generally parallel to said pickup means; and means interconnecting said tension means with said pickup means and operable to urge said pickup means upwardly, said means interconnecting said tension means with said pickup means including cable means connected to one end of said tension means and disposed over sheave means mounted above one end of said pickup means, said cable means being interconnected with one side of said pickup means proximate to the center of gravity of said pickup means.

6. The combination set forth in claim 5 in which said tension means is connected at one end to said cable means and is adjustably secured at an opposite end to said baler.

7. The combination set forth in claim 5 in which said interconnecting means further includes second cable means connected to an opposite end of said tension means and disposed over second sheave means mounted above an opposite end of said pickup means, said second cable means being interconnected with an opposite side of said pickup means proximate to the center of gravity of said pickup means.

8. The combination set forth in claim 5 further characterized by the provision of manually operable means to raise said pickup means, said manually operable means comprising a rope or the like the rear end of which is secured to said baler generally above said pickup means and having intermediate portions disposed over first and second sheaves, one of said sheaves being disposed below said rear end of said rope and interconnected with said pickup means, and the other of said sheaves being mounted on said baler and above said one of said sheaves.

9. The combination set forth in claim 8 in which means are provided to hold said pickup means in its raised position.

10. The combination set forth in claim 5 further characterized by the provision of bracket means secured to said one side of said pickup means generally at said center of gravity of said pickup means and interconnecting said cable means with said one side of said pickup means and the provision of adjusting means disposed between one end of said cable means and said bracket means whereby the force exerted by said tension means on said pickup means may be varied.

* * * * *